Nov. 12, 1946.   E. T. CARLSON   2,411,128
BUS BAR SYSTEM
Filed Dec. 3, 1941   4 Sheets-Sheet 1
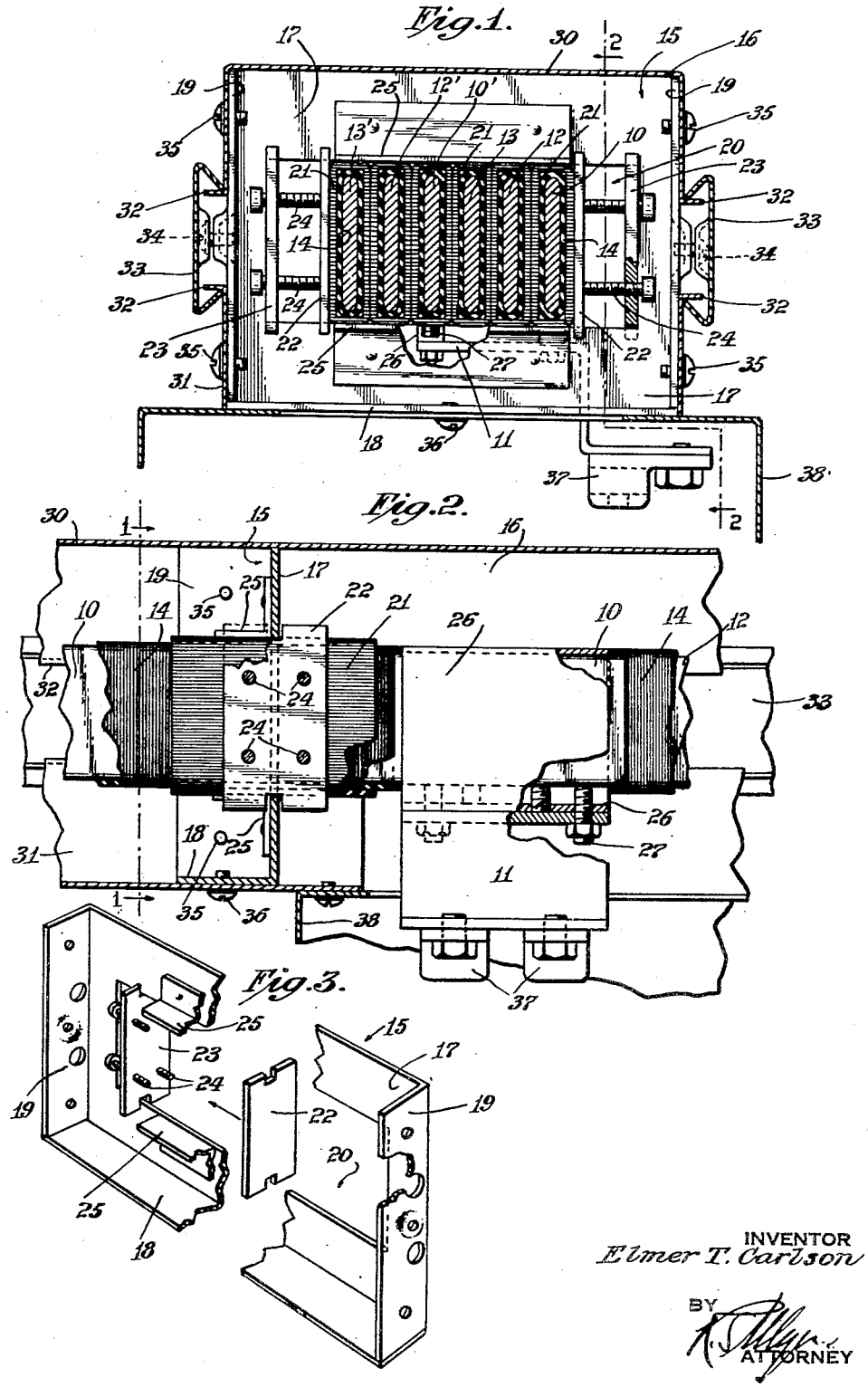
INVENTOR
Elmer T. Carlson
BY
ATTORNEY Nov. 12, 1946. E. T. CARLSON 2,411,128
BUS BAR SYSTEM
Filed Dec. 3, 1941 4 Sheets-Sheet 2
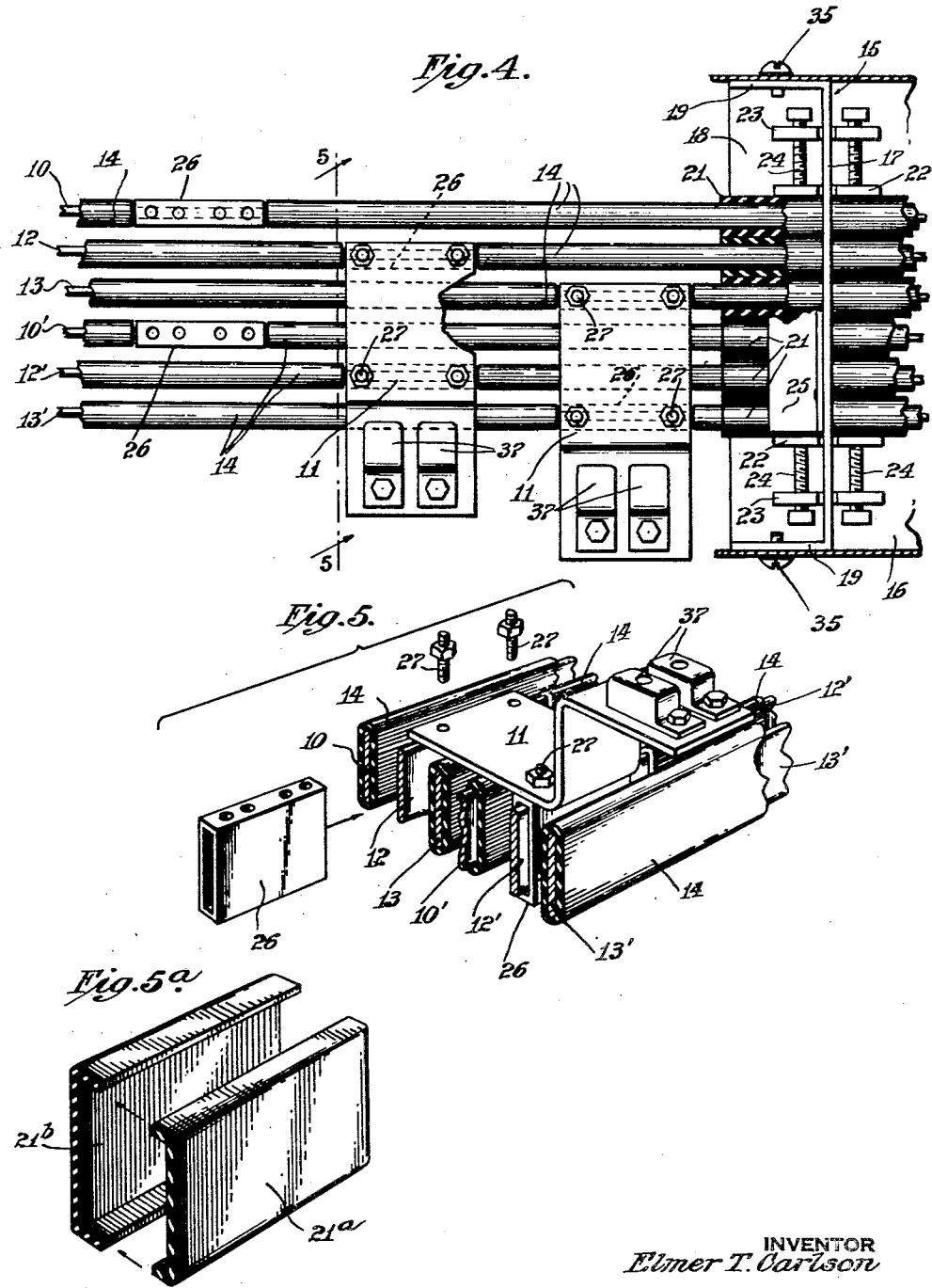
INVENTOR
Elmer T. Carlson
ATTORNEY Nov. 12, 1946.　　　　E. T. CARLSON　　　　2,411,128
BUS BAR SYSTEM
Filed Dec. 3, 1941　　　　4 Sheets-Sheet 3
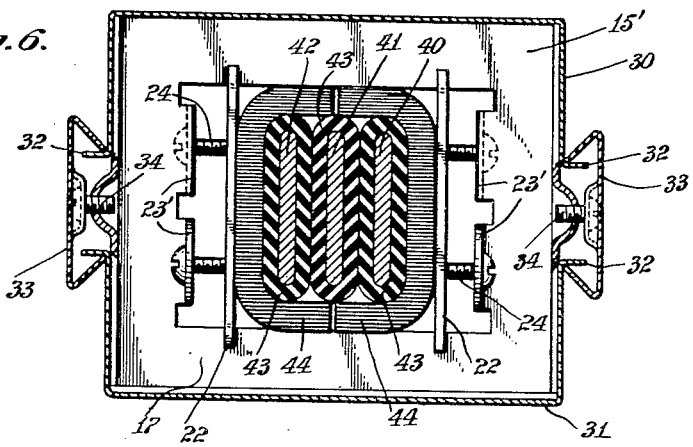
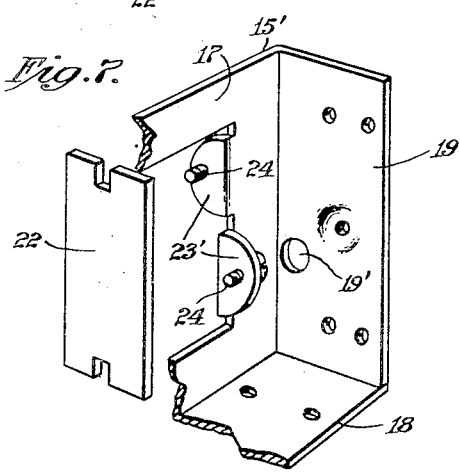
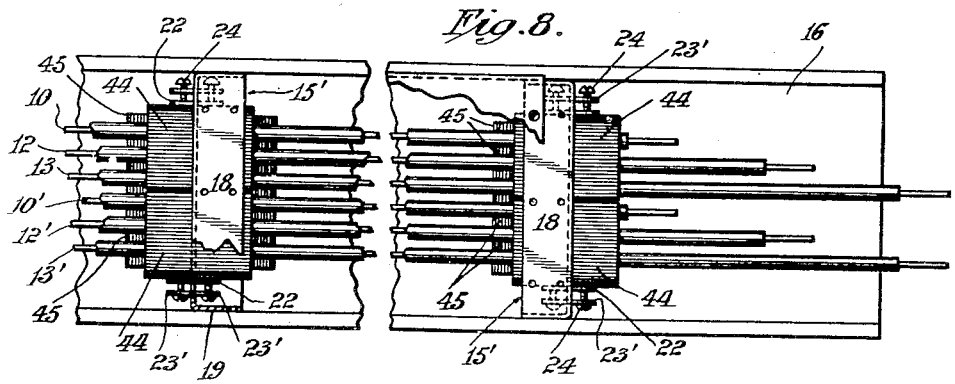
INVENTOR
Elmer T. Carlson
BY
ATTORNEY Nov. 12, 1946.  E. T. CARLSON  2,411,128
BUS BAR SYSTEM
Filed Dec. 3, 1941   4 Sheets-Sheet 4
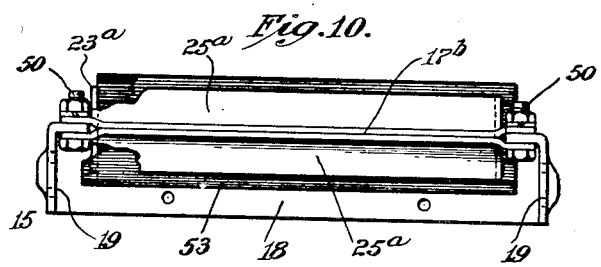
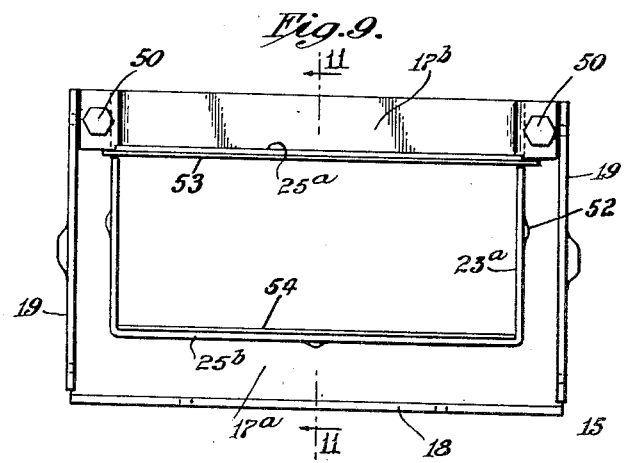 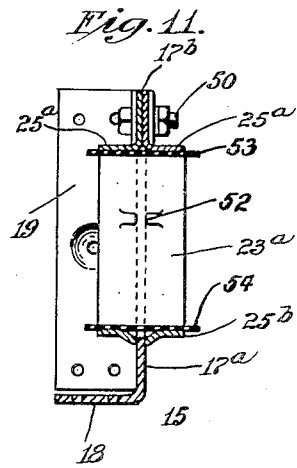
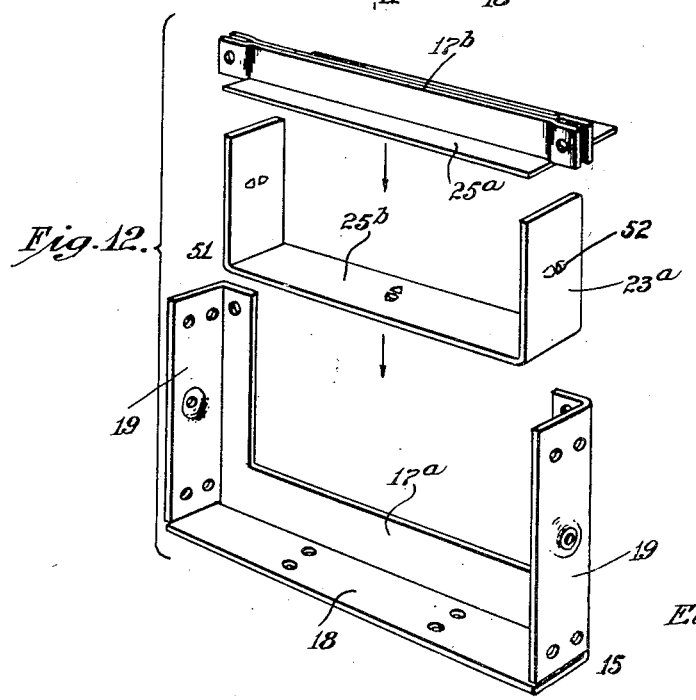
INVENTOR
Elmer T. Carlson Patented Nov. 12, 1946

2,411,128

UNITED STATES PATENT OFFICE 2,411,128

BUS BAR SYSTEM

Elmer T. Carlson, Wyoming, Ohio, assignor to The Trumbull Electric Manufacturing Company, Plainville, Conn., a corporation of Connecticut Application December 3, 1941, Serial No. 421,442

7 Claims. (Cl. 174—99)

This invention relates to systems for the distribution of electricity.

More particularly this invention relates to such distribution systems where bus bars of a flattened configuration are employed and is especially applicable to such systems where polyphase or single phase alternating current is used.

Broadly speaking this invention includes a system and devices for supporting, protecting and properly spacing a plurality of bus bars as used to convey alternating current in a distribution network. In addition this invention provides means for locating the bus bars as closely as possible to one another consistent with the maintenance of a safe operating temperature and with the provision of adequate insulation between the individual bus bars.

In alternating current electrical distributing systems it is very desirable that the impedance be kept as low as possible so that the consequent voltage drop will likewise be kept at a minimum for any given size of conductor. The use of my invention allows the impedance of such a system to be reduced so that it will be lower than that of a system where the individual bus bars are more widely separated from each other than is brought about by the use of my invention.

In carrying out my invention I provide a single enclosing duct which carries within it all the conductors of an A. C. system, such conductors being in the form of flat bus bars positioned extremely close to one another, but restrained from making actual contact with each other by the provision of insulating tubes, an individual tube being placed over each conductor and extending therealong so as to cover the entire length of the conductor, except at the points where an electrical connection is to be made to the conductor.

In carrying out my invention I have furthermore found it possible to clamp together the conductors of my system into a mechanically rigid structure by the use of clamping members located at intervals along the length of the duct. These clamps can likewise be so formed as to function simultaneously as supporting members for the bus bars and as means for maintaining proper spacing of the bus bars within the duct even when stresses are set up under abnormal conditions such as short-circuits.

I have found it desirable that a minimum amount of foreign solid material, especially foreign material of a metallic nature, be placed in close proximity to the bus bars and accordingly I prefer to utilize a single metallic member both to bring about the clamping and to support the bars within the duct just described.

In order to prevent the bus bars from coming in contact with one another at points between the clamps, due to stresses and distortion of the bars which may occur under excessive changes of temperature or heavy overload conditions, I have found it desirable to provide an insulating sheath of substantially uniform thickness over each individual bus bar at all points between the clamps. However, I prefer to use a relatively thin insulating sheath of this type and to employ additional spacing devices located at the clamping points. This method of construction brings about the result that over the greater portion of the length, each insulating sheath is separated from and adjacent sheath by an air space. Such air space may be found desirable for purposes of proper cooling, or for other reasons.

When my invention is employed with single phase or polyphase electrical distributing systems, I have found that still greater efficiency may be obtained by the use of a plurality of bus bars, connected in parallel with one another to replace the single conductor originally used for each phase of such a system and to interleave these plural conductors according to particular methods which will bring about the maximum reduction of impedance.

One object of my invention is to provide an A. C. distributing system in which the inductive reactance is greatly decreased from that of systems according to the prior art.

Another object of my invention is to provide an A. C. distributing system which has a much lower impedance for a given size of duct than would be the case for a system using conductors arranged in a similarly sized duct according to the prior art.

Yet another object of this invention is to reduce the voltage drop occurring between given points along an A. C. distributing system.

Another purpose is to provide an A. C. distributing system in which the bus bars are rigidly bound together and supported, while at the same time adequate electrical insulation exists between adjacent bars and adequate provision is made for cooling the bars.

A still further purpose of this invention is to provide simple devices for use in a system of the type described, which shall rigidly but removably clamp the bus bars together at desired points and which shall at the same time afford support at such points for holding the bars in position, as within an enclosing duct.

An additional purpose is to provide in a system of the character described, means for keeping the temperature of the bus bars below that which would prevail if the bars were separated from one another only by air. I obtain this result by encasing these bars in an insulating material of special characteristics with regard to thermal conductivity.

Another object of my invention is to provide a system of multiple bus bar distribution wherein bars which are separated from one another by intervening bars yet will be connected in parallel with each other so as to bring about a closer interleaving of the magnetic fields from the individual bars and consequent lowering of the transmission impedance characteristics.

A still further object, in a system of the character just described, is to provide staggered connection points for the individual bus bars, so that at any one point along the length of the system the bars which are exposed for purposes of connection will be only the bars which are in parallel with one another, so that a multiple connection may be made at such take-off point to all conductors which constitute a single phase of the system.

Yet another purpose of my invention is to provide a bus bar distributing system wherein the various bars are held rigidly together by clamps but are separated from one another by suitable insulating material, so as to form with these clamps a unitary structure of indefinite length and capable of withstanding distorting stresses which may be produced therein by the passage of abnormally heavy current through the system.

Fig. 1 is a cross sectional view of one form of duct with bus bars arranged, protected and supported according to one method involving my improvements, the section being taken on the plane of the line 1—1 of Fig. 2.

Fig. 2 is a fragmentary longitudinal sectional and side view of the parts shown in Fig. 1, the section being taken on the plane of the line 2—2 of Fig. 1.

Fig. 3 is a perspective view of parts of one form of supporting frame for the bus bars.

Fig. 4 is a view looking upwardly at the bus bars of Figs. 1 and 2 and showing one of the supporting frames.

Fig. 5 is a fragmentary perspective view showing bus bars and a take-off or top bracket.

Fig. 5a is a perspective view of a two-piece sleeve.

Fig. 6 is a transverse sectional view showing a modified form of arrangement and support for bus bars—in this case only three bars.

Fig. 7 is a perspective view of a fragment of a modified form of supporting frame.

Fig. 8 is a fragmentary view looking upwardly at a construction such as shown in Fig. 6 but on a smaller scale and showing six bus bars.

Fig. 9 is a face view of the preferred form of supporting frame for the bus bars.

Fig. 10 is a plan view of the same.

Fig. 11 is a vertical sectional view of the same.

Fig. 12 is an exploded perspective view showing parts of the frame of Figs. 9–11.

The invention as shown in Figs. 1, 2, 4, 5 and 8 involves a three-wire system with the bus bars interleaved, each conductor consisting of two bus bars such as 10, 10' connected by a cross bar 11. Bus bars 12, 12' and 13, 13' are similarly connected. Each bus bar is encased in a tube of insulating material 14 capable of withstanding heat and preferably capable of dissipating heat.

I have found after much research that a most satisfactory composition consists of felted asbestos fibre highly compressed. Such an arrangement has been found to run cooler in fact than bare bars. These tubes may also be coated with waterproofing composition.

The bus bars are tightly bunched by means of frames or collars 15 which serve as clamps and supports within the duct 16. A frame consists of a plate 17 having flanges 28 and 19 and a central opening 20 through which the bus bars extend. This frame may be formed in various ways as shown for instance in Figs. 1 to 6, 7 or 9 to 12. To clamp the bus bars tightly I provide clamping means at one or both sides. When there are more than three bars I prefer to provide a clamp on each side as shown in Fig. 1 so as to bring the bars to the center. This is more important when there are a number of bars whose insulating material undergoes considerable compression which might move the bars off center. In Figs. 1, 2 and 4 I have shown spacing sleeves 21 of insulating material surrounding each bar and its insulating tube adjacent each of the supporting collars.

These sleeves may be formed similar to the tubes 14 or preferably in two parts 21a and 21b as shown in Fig. 5a where part 21a is adapted to fit one side and the edges of the insulated bus bar and the other part 21b is adapted to fit the other side of the insulated bus bar and overlap the edges of the part 21a. This form facilitates assembly of the parts, provides increased surface between conductors and allows for increased pressure against the bus bars without danger of breakage.

Each clamp in this arrangement consists of a plate 22, which slides in the opening 20, and an abutment plate 23. Screws 24 threaded in plate 23 are tightened up to press plate 22 against the adjacent sleeve 21. The plate 23 may be attached to the plate 17 or slide in the opening 20 for convenience in assembly. To afford a better support for the bus bars I prefer to provide angle pieces 25, 25 which are welded or otherwise secured to the plate 17. One or both of these angle pieces may be made vertically adjustable if desired.

The ends of bus bar sections are connected by metallic tubes 26 and set screws 27. These ends are staggered as shown in Fig. 8 so as to avoid having the connectors near each other. When multiple interleaved bars are employed the cross bars 11 are connected to the connectors as shown in Fig. 5.

The form of duct herein shown consists of two parts, an upper channel-like member 30 and a lower similar member 31. Each has a side flange 32 and these flanges are connected by a strip 33 which covers the space between the flanges. The frame 15 has side flanges 19, 19 which serve as splice bars and connect the collar to the duct. A screw 34 passes through the side strip 33 and screws into the bar 19 to hold it in place. Screws 35, 35 pass through the sides of the upper and lower members of the duct into the upper and lower parts of the bars 19, 19 to more securely hold the frame 15 and the enclosed bus bars in place. The bottom flange 18 may also be secured by a screw 36. When take-off terminals 37 are employed it may be desirable to employ an extension box 38 as shown in Fig. 1.

The flanges 18 and 19 may be provided with a double row of screw holes as shown in Figures 7 through 12 so that one row of holes can be used to secure one side of the main casing to the bus bar frames at the end of the section, and the other row of holes can be used to secure a short joint cover in place at the end of the section, see Figure 8.

In the form shown in Fig. 6 there are only three bus bars 40, 41 and 42, each having an insulating sheath 43 and all are clamped together by insulating C-shaped jaws 44 within the supporting frame 15. This frame support is similar to 15 but in this case I have shown lugs 23' in place of the abutment plate 23. In a case like this it may not be necessary to have both plates 22 adjustable since there is much less variation due to compression than when a larger number of bus bars and extra intervening insulation is used. The flange 19 may have a hole 19' to allow for the passage of a screw-driver to the screw in the inner lug.

Although it is possible to obtain highly important results from an assembly like that shown in Fig. 6 it is preferable to space the insulated bars somewhat apart except at the points of support as shown in Figs. 1, 4, 5 and 8. In such cases the insulating tubes may be somewhat thinner than when the tubes are clamped close together.

In Fig. 8, in place of the short spacing sleeves 21, I have shown spacing insulating plates 45, together with the C-shaped pieces 44 of Fig. 6.

The interlacing or interleaving of the bars in multiple as shown in Fig. 1 has been found especially desirable in keeping down voltage drop.

The novel frame or collar support herein shown and claimed permits the bus bars to expand and contract without chafing or causing distortion. This construction results in a minimum of vibration of the bus bars and no harm results from such slight vibration as may take place.

Preferably the top or the bottom bar of the supporting frame 15 is made separate from the remainder as shown in Figs. 9 to 12 so that the frame can be more readily applied to or removed from the duct and the bus bars without demounting the bus bars.

In this form the plate portion of the frame is formed of two parts 17a and 17b secured together by screws or bolts 50 so that one part may be readily attached to or detached from the other part or adjusted relative thereto. The flanges 25a, 25b are made integral with the cross bar 17b and the flanges or plates 23a, 23a are made as integral parts of a U-shaped yoke 51, the bottom 25b of which corresponds with the lower flanges 25 of Figs. 1 and 3. This yoke 51 may have lugs 52 stamped from its surface to coact with the edges of the opening in the plate 17a so as to position the yoke in the frame thus eliminating the necessity of welding or otherwise mechanically securing the yoke to the plate. Similarly the flanges 25a being integral with the edges of the cross bar 17b no welding or riveting is required as would be necessary in the form of Figs. 1 to 3. Insulating fibre strips 53, 54 are also preferably provided above and below the bus bars to cut down the possibility of grounding a circuit. It should be understood that, in this form, while the frame support is being placed around the bus bars, they will be pressed toward each other in a suitable manner. After assembly of the bars within the frames, the outside pressure is released, and the frame supports hold the bars in their precompressed relation.

From the foregoing it will be seen that the bus bars are rigidly clamped in a bundle so that each insulated bar mechanically reinforces the other bars and prevents undue warping of the conductors. This construction also results in an extremely low voltage drop and develops low impedance characteristics.

I claim:

1. A bus duct frame for embracing a group of insulated bus bars and consisting of a main plate having side bars for attachment to opposite sides of the duct, upper and lower flanges for positioning the upper and lower edges of the insulated bus bars, and common means for simultaneously maintaining pressure laterally on all of the bus bars.

2. As an article of manufacture, a supporting frame for multiple bus bars having a main plate with a single passage for the bars, flanges extending from the plate parallel with the edges of the bars to be supported and common means for clamping the bars laterally from opposite sides and centering same within the passage.

3. In a bus bar duct system, a member for supporting a group of insulated bars within a duct comprising a main plate having a passage for the bus bars and outer flanges for supporting the plate within a duct, inner flanges projecting from said plate, clamp screws extending through said latter mentioned inner flanges and accessible through the outer flanges for clamping the bus bars within the passage.

4. A bus bar support comprising a main plate having an opening for bus bars and flanges for connection with walls of a duct, clamp plates slidable in said opening and means coacting with the main plate and said clamp plate for compressing a group of bus bars located between the clamp plates in said main plate.

5. A bus bar support comprising a main plate having an opening for bus bars with lugs at opposite sides of the opening and means for connection with the inner walls of a duct, clamp plates slidable in said opening and clamp screws in said lugs for compressing a group of bus bars located between the clamp plates in said main plate.

6. In a bus bar duct system, a housing comprising two oppositely disposed channel-like members having laterally projecting flanges at their respective edges with spaces between the adjacent flanges, frames mounted within the housing at intervals along its length for supporting bus bars, each frame having side bars and an opening for the bus bars, means carried by the side bars for laterally compressing the bus bars, a flanged molding embracing the projecting flanges of the housing at each side thereof and clamp screws connecting the moldings with the side bars of the bus-bar supporting frames.

7. A frame for supporting a plurality of insulating flat bus bars side by side in an enclosing duct comprising a metallic main plate having side flanges provided with means for attachment to the side walls of a duct, said plate having a passage through its central portion to accommodate a plurality of flat bus bars, upper and lower flanges extending along the upper and lower edges of said opening for positioning the edges of the insulated bus bars and permitting said bus bars to be moved toward each other along said upper and lower flanges and side flanges along the opposite edges of said passage constituting lateral abutments for the bus bars.

ELMER T. CARLSON.